United States Patent
Mahr et al.

(10) Patent No.: US 9,379,850 B2
(45) Date of Patent: Jun. 28, 2016

(54) CONTROLLING RETRANSMISSIONS

(75) Inventors: Christian Mahr, Ulm (DE); Hannu Tapio Häkkinen, Espoo (FI); Hans Kroener, Geislingen-Weiler (DE); Josef Martin Eichinger, Neufinsing (DE); Martin Goldberg, Tokyo (JP); Kari Juhani Hooli, Oulu (FI); Sabine Roessel, Munich (DE); Matti Tapani Kiiski, Oulunsalo (FI); Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 208 days.

(21) Appl. No.: 14/124,458

(22) PCT Filed: Jun. 7, 2011

(86) PCT No.: PCT/EP2011/059418
§ 371 (c)(1),
(2), (4) Date: Apr. 8, 2014

(87) PCT Pub. No.: WO2012/167820
PCT Pub. Date: Dec. 13, 2012

(65) Prior Publication Data
US 2014/0293889 A1 Oct. 2, 2014

(51) Int. Cl.
*H04L 1/18* (2006.01)
*H04B 7/02* (2006.01)
*H04B 7/04* (2006.01)

(52) U.S. Cl.
CPC .............. *H04L 1/1854* (2013.01); *H04B 7/024* (2013.01); *H04L 1/1825* (2013.01); *H04L 1/1864* (2013.01); *H04B 7/0413* (2013.01)

(58) Field of Classification Search
CPC ... H04L 1/1854; H04L 1/1864; H04L 1/1825; H04L 1/1607; H04B 7/024; H04B 7/0413

USPC ......... 370/229, 230, 235, 241, 242, 310, 328, 370/338, 351, 389, 395.1, 395.2, 431, 432, 370/329; 455/403, 422.1, 7, 24
See application file for complete search history.

(56) References Cited

U.S. PATENT DOCUMENTS

| | | | |
|---|---|---|---|
| 2005/0030964 A1* | 2/2005 | Tiedemann et al. | 370/431 |
| 2010/0107028 A1 | 4/2010 | Gorokhov et al. | 714/748 |
| 2010/0142466 A1* | 6/2010 | Palanki et al. | 370/329 |
| 2011/0149877 A1* | 6/2011 | Hafeez | 370/329 |
| 2012/0147815 A1* | 6/2012 | Meyer et al. | 370/328 |
| 2014/0036865 A1* | 2/2014 | Camarda et al. | 370/330 |

FOREIGN PATENT DOCUMENTS

| | | | |
|---|---|---|---|
| EP | 2 320 592 A1 | 5/2011 | |
| WO | WO 2010/105702 A2 | 9/2010 | |
| WO | WO 2011/020980 A1 | 2/2011 | |

OTHER PUBLICATIONS

3GPP TSG RAN WG1 Meeting #64, Taipei, Taiwan, Feb. 21-25, 2011, "Opportunistic coordinated multi-point reception for multi-codeword uplink transmission", R1-111008, I2R, 6 pgs.

* cited by examiner

*Primary Examiner* — Obaidul Huq
(74) *Attorney, Agent, or Firm* — Harrington & Smith (57) ABSTRACT

A method and apparatus for controlling retransmissions in multipoint reception is disclosed. In the method it is determined that additional information is needed for decoding of at least one received information block. A procedure is selected for obtaining the additional information from a plurality of options to proceed based on information about predicted result of at least one of the options. In accordance with an aspect an indication of one of a positive acknowledgement of the information block, a negative acknowledgement of the information block and suspension of retransmission of the information block is generated and communicated on a retransmission control channel.

21 Claims, 5 Drawing Sheets

CONTROLLING RETRANSMISSIONS

This disclosure relates to control of retransmissions in a communication system where a plurality of reception points can be provided.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment. The communication device may access a carrier provided by a station, for example a base station, and transmit and/or receive communications on the carrier.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can be provided with error correction functionality, such as with a possibility of requesting for retransmission of any information that the recipient could not successfully decode. For example, the 3GPP LTE uses a hybrid automatic repeat request (HARQ) error control mechanism. The error control mechanism can be implemented such that a device which receives either a positive or a negative acknowledgement (ACK/NACK) or other indication from another device of an error free or erroneous receipt of transmitted data can take appropriate action. Typically this means resending of a faulty protocol data unit to the receiving device in response to a negative acknowledgement. In LTE the acknowledgement signalling can be communicated on a physical HARQ indicator channel (PHICH) based on a HARQ timing scheme.

A communication system can comprise different types of radio service areas providing transmission/reception points for the users. For example, in LTE-Advanced the transmission/reception points can comprise wide area network nodes such as a macro eNode B (eNB) which may, for example, provide coverage for an entire cell or similar radio service area. Network nodes can also be small or local radio service area network nodes, for example Home eNBs (HeNB), pico eNodeBs (pico-eNB), or femto nodes. Some applications utilise radio remote heads (RRH) that are connected to for example an eNB. The smaller radio service areas can be located wholly or partially within the larger radio service area. A user equipment may thus be located within, and thus communicate with, more than one radio service area. The nodes of the smaller radio service areas may be configured to support local offload. The local nodes can also, for example, be configured to extend the range of a cell.

Coordinated multi-point reception (CoMP) is considered for LTE-Advanced as a tool to improve the coverage of high data rates, to increase data rates at cell edge, and to increase system throughput. Uplink CoMP implies reception of the signal from a user equipment at multiple, geographically separated points connected via appropriate backhaul connections.

Use of a retransmission mechanism in combination with multipoint reception, for example CoMP, involves some unresolved issues. For example, HARQ feedback transmission on the downlink (DL) shall start 3 ms after the end of corresponding physical uplink shared channel (PUSCH) transmission. The fixed timing of HARQ feedback together with feasible processing times can set relatively strict capacity and latency requirements for the backhaul connections between the different reception points. Although these requirements can be met for example with high rate connections such as direct optical fibre connections, such connections may not always be economically feasible and/or available in all deployment environments. Thus it is possible that information from the various reception points is not available at the relevant time at the node decoding the received signal. Also, parallel retransmissions and signalling of the information on the backhaul between the receiving points may unnecessarily load the system.

It is noted that the above discussed issues are not limited to any particular communication environment, but may occur in any appropriate communication system with retransmission mechanism and comprising a plurality of reception points.

Embodiments of the invention aim to address one or several of the above issues.

In accordance with an embodiment there is provided a method for controlling retransmissions in multipoint reception, comprising receiving at least one information block, determining that additional information is needed for decoding of the at least one received information block, and selecting a procedure for obtaining the additional information from a plurality of options to proceed based on information about predicted result of at least one of the options.

In accordance with an embodiment there is provided an apparatus for controlling retransmissions in multipoint reception, the apparatus comprising at least one processor, and at least one memory including computer program code, wherein the at least one memory and the computer program code are configured, with the at least one processor, to decode at least one received information block, determine that additional information is needed for decoding the at least one received information block, and select a procedure for obtaining the additional information from a plurality of options to proceed based on information about predicted result of at least one of the options.

In accordance with an embodiment there is provided a method for controlling retransmissions, comprising determining whether retransmission of a received information block is to be suspended, selectively generating an indication of one of a positive acknowledgement of the information block, a negative acknowledgement of the information block and suspension of retransmission of the information block, and sending the indication on a retransmission control channel.

In accordance with an embodiment there is provided a method for proving retransmissions, comprising sending an information block, detecting reception of an indication that retransmission of the information block is to be suspended, and suspending the retransmission until a predefined event.

In accordance with a further embodiment there is provided an apparatus for controlling retransmissions, the apparatus comprising at least one processor, and at least one memory including computer program code, wherein the at least one memory and the computer program code are configured, with the at least one processor, to determine whether retransmission of a received information block is to be suspended, selectively generate an indication of one of a positive acknowledgement of the information block, a negative acknowledgement of the information block and suspension of retransmission of the information block, and cause sending of the indication on a retransmission control channel.

In accordance with a yet further embodiment there is provided an n apparatus for controlling retransmissions, the apparatus comprising at least one processor, and at least one memory including computer program code, wherein the at least one memory and the computer program code are configured, with the at least one processor, to cause sending of an information block, detect reception of an indication that retransmission of the information block is to be suspended, and suspend the retransmission until a predefined event.

In accordance with more specific aspect selecting a procedure for obtaining additional information can comprise taking into account at least one of decoding gain from the multipoint reception, data communications capacity between the multiple reception points, and earlier at least one retransmission.

Retransmission of at least one information block may be suspended. The retransmission may be suspended by sending to a transmitting station an indication of the suspension, wherein the indication comprises one of a positive acknowledgement and an explicit suspension request. An explicit suspension request may comprise the indication consisting of two bits. A second indication may be communicated, the second indication comprising a positive or negative acknowledgement generated after decoding based on information from multiple reception points. The second indication may be communicated on a further retransmission control channel resource.

Additional information for use in decoding may be received from at least one secondary reception point. A negative acknowledgement may be sent timing in response to failed decoding based on the additional information.

At least one user equipment may be selected to be the subject of a procedure for obtaining additional information for decoding from at least one secondary reception point.

A procedure may be selected on a per transport block basis.

The multipoint reception may be based on hierarchical coordinated multipoint and/or at least partially on peer-to-peer coordinated multipoint.

Selecting may comprise taking into account cumulative backhaul load associated with at least one user equipment.

A selection metric reflecting an expected gain from the multipoint reception may be determined. The selection metric may be used in selection of information blocks for multipoint reception.

A likely outcome of decoding of at least one information block may be predicted for instances where additional information from multipoint reception is taken into account. Retransmission may be suspended or scheduling of a next information block initiated based on the prediction.

The apparatus may be provided in a node for a communication system.

A computer program comprising program code means adapted to perform the method may also be provided.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipments (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
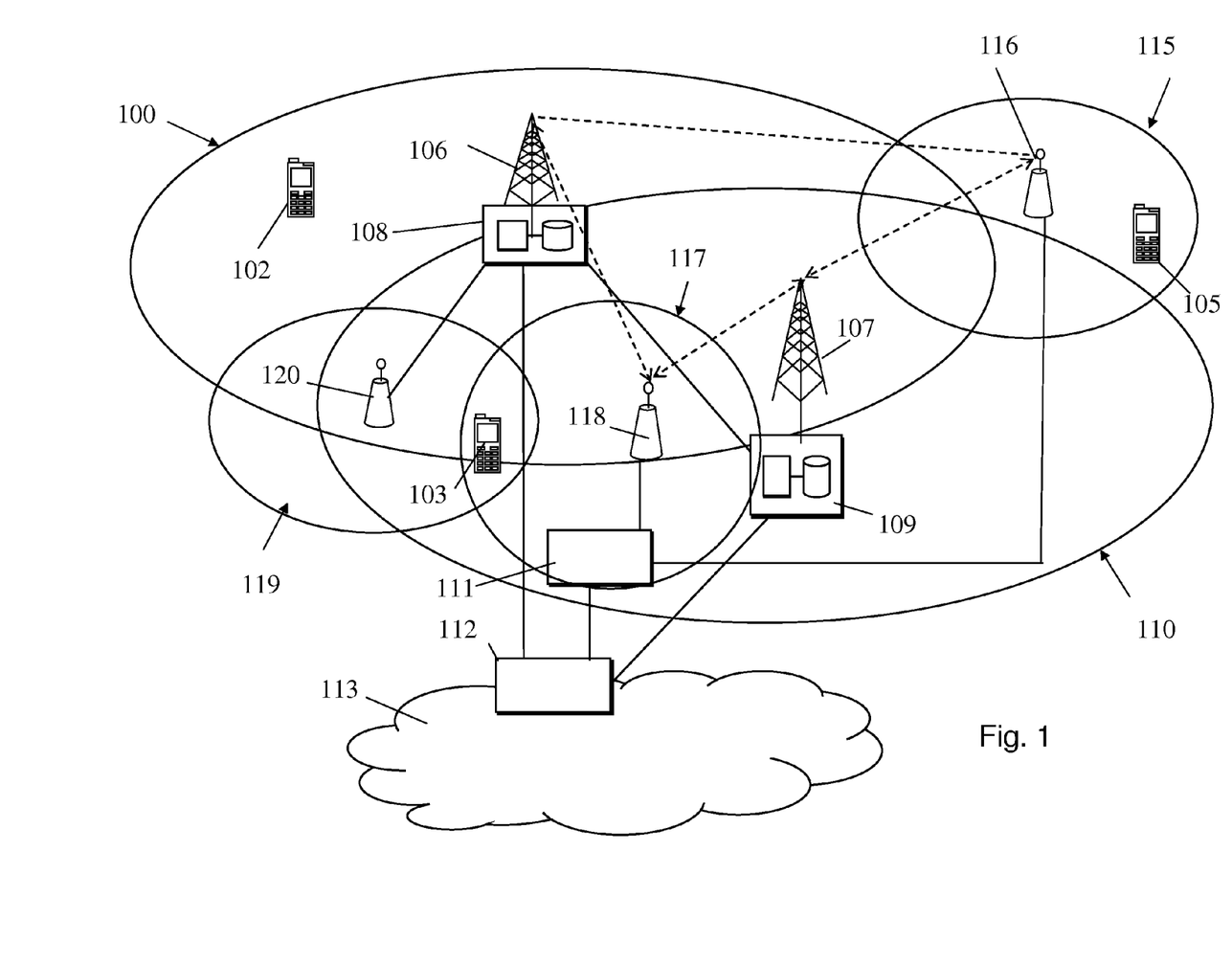
FIG. 1 shows a schematic diagram of a network according to some embodiments.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. It is noted that more than one macro level base station may be controlled e.g. by control apparatus 108. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown as connected to a wider communications network 113 via gateway 112. A further gateway function may be provided to connect to another network. The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108.

Figure 2:
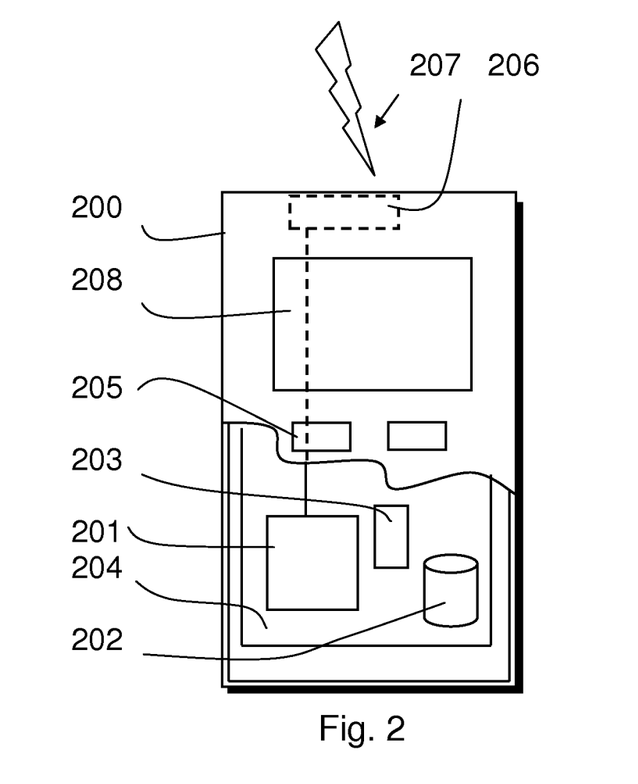
FIG. 2 shows a schematic diagram of a mobile communication device according to some embodiments.

A possible mobile communication device for transmitting and retransmitting information blocks towards the stations of the system will now be described in more detail in reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antennae elements. A station may comprise an array of multiple antennae. Signalling and muting patterns can be associated with Tx antenna numbers or port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
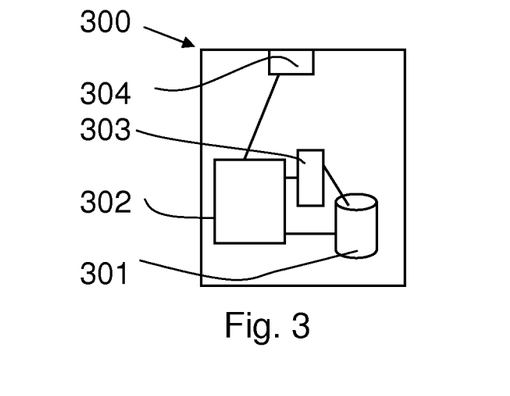
FIG. 3 shows a schematic diagram of a control apparatus according to some embodiments.

FIG. 3 shows an example of a control apparatus for a communication system, for example to be coupled to and/or for controlling one or more stations of an access system. In some embodiments base stations comprise a separate control apparatus. In other embodiments the control apparatus can be another network element. The control apparatus 300 can be arranged to provide control on communications in the service area of the system. The control apparatus 108 can be configured to provide control functions in association with generation and communication of request and instructions in view of reception of information blocks, retransmissions and other related information by means of the data processing facility in accordance with certain embodiments described below. For this purpose the control apparatus 300 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions. It shall be appreciated that similar component can be provided in a control apparatus provided elsewhere in the system for controlling reception of sufficient information for decoding of received information blocks.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Examples for LTE multipoint reception are described below with reference to stations 106, 107, 118 and 120 and mobile communication device 103 of FIG. 1. More particularly, the following certain examples are given in relation to uplink (UL) receiver operation and HARQ-ACK feedback in the case of CoMP (Coordinated multi-point) reception. CoMP reception is considered for LTE-Advanced as an appropriate tool for improving the coverage of high data rates and to increase system throughput. Uplink CoMP implies reception of the transmitted signal at multiple, geographically separated points.

FIG. 1 shows different kinds of transmission/reception points. Two wide radio service areas are provided by base stations 106 and 107, which can be macro-eNBs. A macro-eNB transmits and receives data over the entire coverage of the cell it provides. FIG. 1 also shows three smaller stations or transmission/reception points 116, 118 and 120. The coverage of these base stations may generally be smaller than the coverage of the wide area base stations. The coverage provided by the smaller nodes 116, 118 and 120 can overlap with the coverage provided by one or more of the macro-eNBs 106 and 107. The transmission/reception (Tx/Rx) points can be eNBs that are interconnected, either directly or via intermediate nodes. The transmission/reception (Tx/Rx) points can comprise Radio Remote Heads (RRH) connected to one central unit, for example a NodeB. This is illustrated by node 120 and its connection to controller apparatus 108 of eNB 106. A RRH can comprise in a simple form antennas, appropriate radio frequency (RF) circuitry and analog-to-digital converters and downconverters. Alternatively, a RRH may perform also at least some of the baseband processing, e.g., demodulation and/or decoding. The functional split between RRH and the central unit can be arranged various ways. There can be also different kind of connections between Tx/Rx points, ranging from fibre connections with large capacity, these being shown by solid lines, and very short latency to X2-type of connections with limited capacity and latency in the range of 10-20 ms. The latter mentioned are illustrated by dashed lines between the stations.

CoMP arrangements can be roughly split in two categories: Hierarchical CoMP and Peer-to-peer (P2P) CoMP. Both categories can exist in the same network. Thus for example P2P CoMP can occur between hierarchical CoMP entities.

In a hierarchical CoMP arrangement UL reception is provided in two stages. A remote eNB stage (ReS) is provided at Tx/Rx points, e.g. node 120. The other stage is provided centrally as a central eNB stage (CeS), e.g. at the control apparatus 108 of node 106. The remote Tx/Rx points can be simple RRHs, or more advanced. Thus, if appropriate, the remote Tx/Rx points can perform also part of baseband processing (e.g. FFT and/or equalization and/or decoding), or even terminate air interface on protocol layer 1 (L1) and, possibly protocol layer 2 (L2). A part of radio resource management (RRM) may also be located on a remote Tx/Rx point. For example, when a remote eNB stage (ReS) connection to a central eNB stage has long latency ReS may need to perform independent scheduling which can be constrained by central eNB Stage scheduler. Regardless their intelligence, ReS are typically connected to network via central eNB stage and thus all air interface layers are not necessarily terminated on them. The central eNB stage (CeS) can be provided e.g. as a baseband hotel, or normal eNB controlling a few connected RRHs. At least some of the air interface layers can be terminated on them, and they can host at least part of RRM functions for all connected ReSs. A CeS can be connected to different kind of ReSs with various connection capacities and latencies. The central unit providing CoMP control functions accommodates higher layer processing as well as (at least) some of L1/L2 processing. If local/cell level detection fails, whole information block can be transferred to the central unit for CoMP detection. The local/cell level processing entity can then relay the HARQ feedback from the central unit to the transmitting user equipment. It is noted that more than one macro eNBs may be connected to the central unit 108.

In a peer-to-peer CoMP, Tx/Rx points are separate eNBs that are interconnected and coordinate transmission and/or reception. Air interface layers are terminated on the Tx/Rx point for the associated user equipments. Primary reception point or primary baseband processing unit can thus bee seen as being neighboured by corresponding reception points or processing units serving as secondary reception points for the given user equipment.

In both categories, one of the Tx/Rx points can be referred to as a primary Tx/Rx point for a particular user equipment (UE). Other Tx/Rx points that actively receive transmissions from the UE can be referred to as secondary Tx/Rx points. The primary Tx/Rx point is UE specific. Thus secondary reception points can be primary reception points for other UEs. The primary Tx/Rx point transmits HARQ feedback for the UE in question.

In P2P CoMP, primary Tx/Rx point collects the corresponding received signal information from secondary Tx/Rx points for CoMP reception which takes place on the primary Tx/Rx point. It should be noted that the 'received signal information' can be signalled in several different forms over the backhaul between the nodes. The information can also be utilized several ways to improve detection. In Hierarchical CoMP, local detection may take place on the remote eNB stage, but CoMP reception takes place on central eNB Stage that collects the received signal information from the corresponding remote eNB stages. In this context "local detection" can be understood to mean a detection that is based on information received only from the reception point where decoding occurs. For each transport block (TB) transmission and retransmission, both normal (local) reception and CoMP reception can take place. In LTE uplink (UL) there are 8 Stop-And-Wait HARQ channels. As they are synchronous in the UL, HARQ feedback transmission on the downlink (DL) shall start 3 ms after the end of corresponding physical uplink shared channel (PUSCH) transmission. This sets strict capacity and latency requirements on the backhaul connections between the different reception points.

The following considers scenarios where limited backhaul capacity and latencies over 1 ms influence CoMP reception and HARQ feedback. In some of the embodiments backward compatibility with legacy mobile user equipment is kept. Both Hierarchical and peer-to-peer CoMPs are considered. For notational simplicity "CoMP reception" is used in the following for reception of information block, for example a transport block (TB) from one or more Tx/Rx points. The secondary Tx/Rx points can have an inter-point connection to the primary reception point with capacity and/or latency limitations.

Figure 4:
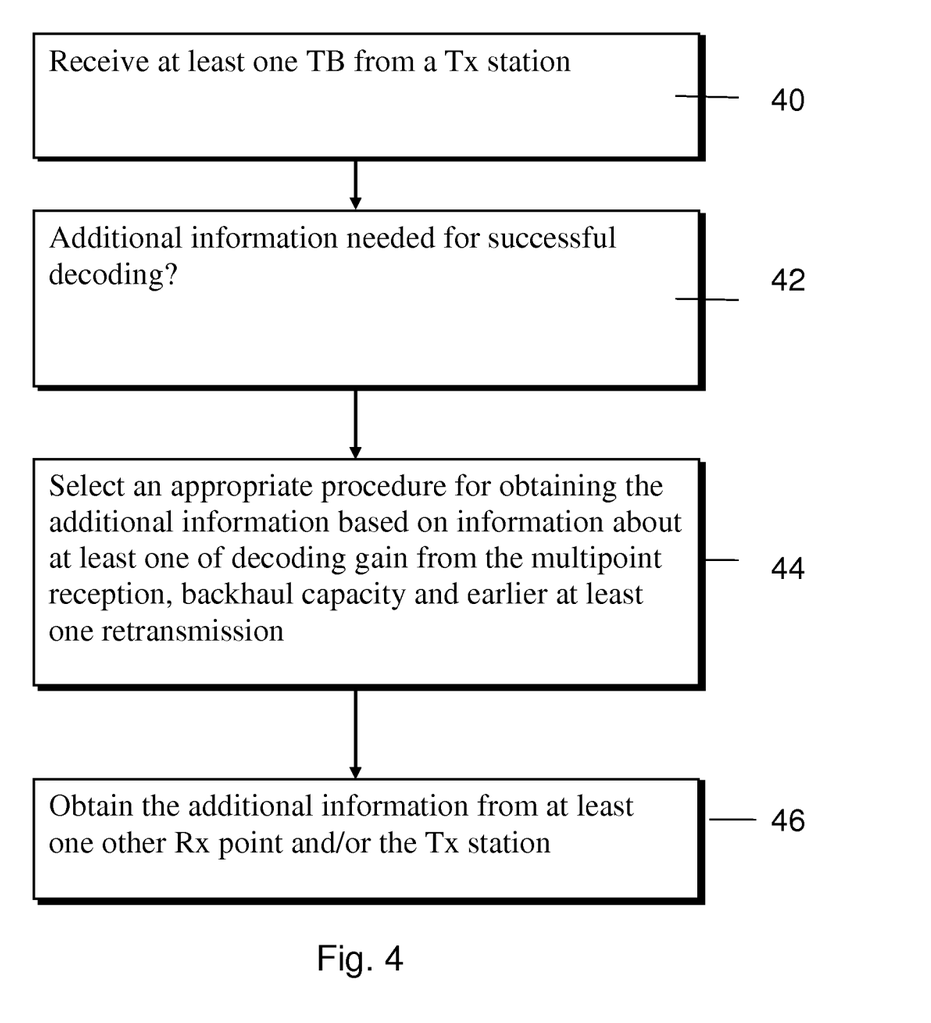
FIG. 4 shows a flow chart according to an embodiment.

In accordance with an embodiment shown in FIG. 4 use of CoMP reception, and correspondingly, a HARQ retransmission method, is dynamically selected at 44 for each HARQ transmission of a transmission block (TB) received from a transmitting station at 40 after it has been determined at 42 that additional information is needed. The additional information can be provided at 46 by means of retransmission(s) from the transmitting station and/or from at least one other reception point. The HARQ feedback selection in the case of failed decoding can be made between a plurality of methods based on a predefined selection criteria. Some of the possible procedures and the criteria are described below.

A possible procedure that can be selected, termed method 1 herein for simplicity of presentation, is where the primary eNB may determine one or more user equipment for which CoMP reception shall be used in the case of failed decoding of an information block. The failure may have actually happened, or it is determined that a failure is likely. The selection may be based on information about decoding gains from multipoint reception and/or capacity limitations on the link between the relevant nodes and/or previous retransmission attempts.

If the information block cannot be successfully decoded with information available at the primary reception point for the first possible ACK/NACK transmission opportunity, it may well be that successful decoding is possible when additional information from further reception points becomes available in subsequent transmission timing intervals (TTIs). For such user equipments retransmissions can be temporarily suspended in the case of failed decoding. A desired behaviour in this case can thus be to suspend the respective HARQ channel until the outcome of the complete decoding based on additional information during a predefined subsequent transmission timing interval is available.

To provide this, if decoding of transmission fails in the primary reception, a positive acknowledgement (ACK) can be transmitted on a physical HARQ indicator channel (PHICH) to suspend the relevant HARQ channel. The eNB can then wait for the received signal information from the secondary reception points. Decoding can still fail after second, or predefined nth, try with signals from secondary reception points. In this case a retransmission can be scheduled n*8 ms later via PDCCH without toggling new data indicator (NDI) in the corresponding Downlink Control Information (DCI). Although method 1 avoids unnecessary retransmissions, it can also somewhat reduce the achievable UE throughput as transmission may not be possible in all subframes. Furthermore, method 1 may marginally increase overhead on physical downlink control channel (PDCCH) for non-scheduled re-transmissions. Also the cumulative distribution function (cdf) tail in latency distribution is increased.

According to another possible procedure the primary reception point may choose, termed method 2 herein, in the even that decoding of transmission is determined to fail in the primary reception, to send a negative acknowledgement (NACK) without waiting for the received signal information from one or more secondary reception points. The information from the secondary reception points can nevertheless be utilized in the decoding of following retransmission. A downside of this method is that the gain from inter-site multipoint reception can become reduced as gain is limited to retransmissions.

Instead of detection of a failure, the information available at the primary reception point for the first possible ACK/NACK transmission opportunity may also only indicate a rather low reliability and that successful decoding after the currently processed UL transmission is rather unlikely, even if additional information from further reception points gets available in subsequent transmission timing intervals (TTIs). In such instance a primary reception point can select to perform an ordinary retransmission procedure by sending a NACK which triggers a non-adaptive retransmission for the information block in the UE.

According to a further possibility, a primary reception point may select to order the retransmissions until it can predict with high enough probability that additional information from multipoint reception can be successfully used in decoding.

According an option eNB or another control unit associated with the primary reception point orders necessary retransmissions until a predefined time has lapsed and/or predefined number of retransmission has taken place. If the information block still remains undecoded, information from multipoint reception is tried.

In such case eNB can decide to proceed such that retransmissions are suspended even if the decoding of the information block has not yet succeeded and before the subsequent CoMP reception takes place.

A further option is to choose perform a normal retransmission, for example in accordance with 3GPP specifications. In this option the information block can be successfully decoded based on information available at the primary reception point for the first possible ACK/NACK transmission opportunity after the retransmission. In LTE this would be after 4 subframes, and thus the primary reception point can decide to perform an ordinary 3GPP procedure. For example, in accordance with 3GPP release 8, the eNB can send an ACK to suspend the respective HARQ channel until the next scheduling event on PDCCH is received.

The selection of an appropriate procedure can be done jointly over all scheduled information blocks, for example transmission blocks (TBs) by sorting the blocks according to the expected gain to be achieved with the received signal information from the secondary reception points. For example, transmission blocks (TBs) can be selected for CoMP reception according the sorted order until the inter-point connection capacity is filled.

Figure 5:
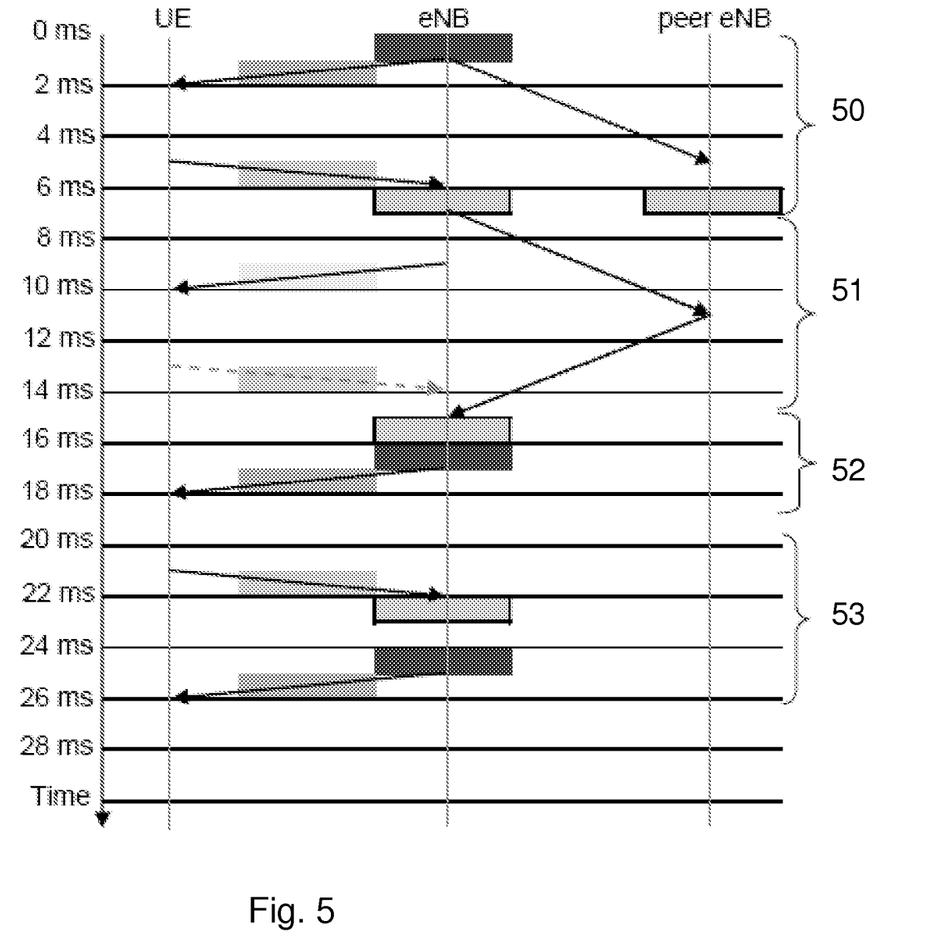
FIGS. 5 and 6 show a signalling diagrams illustrating methods according to certain embodiments.
Figure 6:
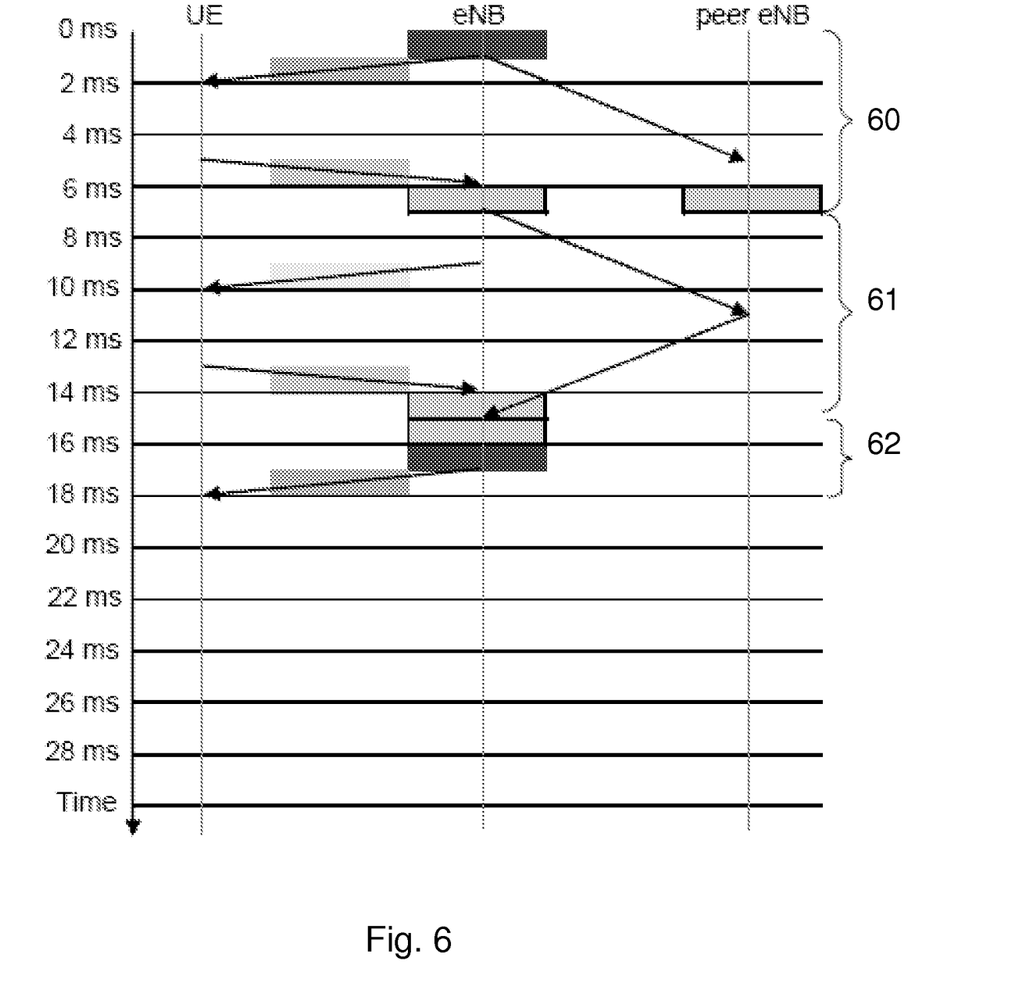

Examples for possible signalling in view of decoding of transmission blocks (TBs) between a user equipment, a primary eNB and a peer eNB are illustrated for certain embodiments in FIGS. 5 and 6. In these examples it is assumed that two transmissions and one spatial increment (i.e. CoMP reception) are needed for correct decoding of a TB.

In accordance with the embodiment shown in FIG. 5, for UEs with failed decoding of a received TB, PHICH-ACK is sent to suspend retransmissions for those UEs that have been selected to CoMP reception in accordance with method 1 above. PHICH-NACK is sent for UEs not selected to use CoMP reception, or that were selected to use method 2.

In accordance with another embodiment shown in FIG. 6, PHICH-ACK will be sent for UEs that are selected to use CoMP reception with high predicted probability of successful decoding after CoMP reception. PHICH-NACK will be send to other UEs with failed decoding of a received TB.

The selection may be done also on coarser scale than per TB. For example, the selection can be provided for a set of transmission timing intervals (TTIs) at a time.

Secondary reception points can communicate the received signal information to a primary reception point (or CeS) only for UEs or physical resource blocks (PRBs) that have been identified in a request by the primary reception point (or CeS). The selection of TBs or PRBs can be done at multiple time instants, for example after first decoding (based on locally received signals and, if available, received signal information from secondary Rx points on prior transmissions of the TB). At this point accurate channel and signal to interference and noise ratio (SINR) local estimates are available as is knowledge of TBs for which the local decoding failed. Another possibility is to perform the selection right after scheduling. At this point, channel and SINR estimates used in scheduling can be used. This provides over 5 ms (5 ms plus detection and decoding time) more time for backhaul communications. However, TBs for which the local decoding fails are not necessarily known at this point and hence the TB selection accuracy may be reduced.

The secondary reception points need to have necessary information about scheduling and adaptive modulation and coding (AMC) decisions from the primary reception point (or CeS) early enough before the actual air interface transmission so that the secondary reception points can capture and pre-process (e.g. equalize and decode for soft bit information) the received signal information. This can require separate signalling in addition to the received signal information requests. An exception is when inter-cell interference cancellation is used as the CoMP reception method. In that case, normally detected signals can be conveyed to the primary reception point as the received signal information and secondary reception points do not need to do anything extra.

Calculation of a TB-specific selection metric for use in the above referenced selection can be based on various information. The selection metric can reflect expected gain from the CoMP reception, and can be used at least in part to provide an estimate of the success of decoding based on various available options. To provide this one of more of the following may be considered when determining the metric:channel and signal to interference and noise ratio (SINR) estimates for the signal received at the primary reception point, previously received channel state information (CSI) from the secondary reception points, coordinated scheduling decisions (including allocated UEs and corresponding PRBs and MCSs), UEs transmission powers, delay budget e.g. for IP packet forwarding and/or number of already occurred transmission and/or retransmissions for the TB in question, the outcome and/or impact of previous CoMP receptions and so on.

In accordance with a possibility the CoMP reception stage can be seen as 'spatial increment' in HARQ process, especially if CoMP reception includes further collection and combining of received signal samples on desired signal.

Selection metric can be an estimate of expected increase in SINR via CoMP reception. According to other possibilities the metric is an estimate of the probability of successful decoding after CoMP reception, relative increase in probability of successful decoding (i.e. ratio of probabilities before and after CoMP reception), increase in throughput, and/or decrease of latency.

Selection metric can be weighted with the number of physical resource blocks (PRBs) allocated for the UE in question to reflect the potential impact on the available radio resources. Also the number of already occurred transmissions and/or retransmissions can be taken into account in the weighing. For example, if an UE has already retransmitted a TB without CoMP reception during previous transmissions, it can be prioritized by suitably weighting selection metric.

A primary reception point may be connected via multiple links to other reception points. On the other hand, received signal information is not necessarily transmitted via all backhaul links for every TB selected for CoMP reception. This can be so because the signals information is not received with reasonable quality in all of the Rx points. Hence, capacity of some backhaul links can be reached while other links still have vacant capacity. At that point, selection metrics may be recalculated for non-selected TBs by removing impact of already full backhaul links from the selection metric. TBs may be re-sorted and selection continued until available capacity of all backhaul links is reached.

The backhaul capacity for a specific link may be predetermined for the primary reception point as part of its configuration. For example, the configuration can define the amount of data the primary reception point can request via the backhaul link in certain time period, e.g. TTI.

User equipments can be selected for CoMP reception up to a predetermined amount of backhaul data and in the order determined by the selection metric. Thus the selection procedure may take into account cumulative backhaul load associated with a user equipment, or a group of user equipments.

The selection metric can be used to provide an estimate of expected probability of successful decoding after CoMP reception. This estimation is referred to in the following as HARQ retransmission predictor because of its capability to predict the outcome of CoMP reception (success or fail of decoding) and the need for further retransmission(s). In here a selection metric can be used to select TBs to CoMP reception and corresponding backhaul communications. HARQ prediction can then be used to determine if retransmissions for that TB can be ended and corresponding HARQ channel can proceed already to next TB (this scenario is shown in FIG. 6). Error on the prediction, that is when the prediction is that the CoMP reception will succeed but CoMP reception actually fails, would typically cause higher layer ARQ retransmission while error on the selection metric does not have such penalty. Thus prediction is preferably more conservative. Considering the scenarios of FIGS. 5 and 6, FIG. 5 illustrates a case where the predictor is more 'optimistic'.

Prediction can be based e.g. on received SINR/MCS comparison with look-up tables, previously collected statistics or other similar information. Prediction can also be based on statistics of TB's soft output bits. A possibility is to base the prediction on a combination on the distance of the soft outputs' mean value from "un-decidable" value (e.g. soft outputs' mean absolute value when "un-decidable" value is zero) and the variance of soft outputs' absolute value.

In accordance with an embodiment the quality of HARQ retransmission predictor can be improved based on signalling of local detection metrics from peer eNB(s) or ReS(s). The detection metrics may describe the quality of received signal information on that Rx point and, thus, be indicative of the contribution the peer eNB/ReS may make to CoMP reception. Thus, the detection metrics can improve the HARQ retransmission prediction. The detection metrics may also be based on local reception condition related to some other (earlier) HARQ stop and wait (SAW) channel as these can be more up to date than metrics or cyclic redundancy check (CRC) result based on earlier CoMP reception(s). The metrics signalled between nodes are UE specific. Signaling per UE may be periodic or adaptive to the significance of local contribution. Prioritisation can be used on the backhaul to provide lower latency for selected low-rate signalling than for basic data needed for CoMP reception. Detection metrics may be part of the prioritised traffic. It should be noted that backhaul transport typically supports prioritizing, e.g. based on Differentiated Services Code Point/Internet Protocol (DSCP/IP). Thus, the detection metrics may be signalled at high priority (and lower latency) apart from the user data related received signal information transport (which may be signalled with higher latency). High priority signalling can be applied also to signal scheduling decisions and/or requests for received signal information.

The embodiments shown in FIGS. 5 and 6 differ mainly on the actions taken based on the outcome of the HARQ predictor.

The embodiment of FIG. 5 aims to avoid unnecessary retransmissions. First PUSCH is scheduled via PDCCH, then transmitted by the UE and received on two eNBs, see 50. While the eNB waits for the received signal information from the peer eNB, HARQ process is suspended with PHICH-ACK, see 51. TB retransmission can be requested if it is likely that CoMP reception alone is not sufficient for successful TB decoding and/or if TB/UE is recognised to have tight latency requirements, e.g. VoIP. Otherwise, HARQ channel can be halted/suspended to wait for CoMP reception outcome. Meanwhile another user can be scheduled on the free resource. If CoMP reception fails, retransmission can be scheduled e.g. via PDCCH at 52. Reception is shown at 53 to succeed after the second transmission. Next TB can then be scheduled. Although this may be beneficial from system capacity viewpoint, this can also degrade UE throughput and increase PDCCH load due to more frequent use of adaptive HARQ retransmissions.

The embodiment of FIG. 6 aims to early determination of TB retransmissions. As above, PUSCH is scheduled via PDCCH, then transmitted by the UE and received on two eNBs at 60. If HARQ predictor estimates that TB decoding is very likely to succeed after CoMP reception, it will send ACK and schedule next TB (if otherwise appropriate) already before the actual CoMP reception takes place. Otherwise it will request TB retransmission at 61 while waiting for the received signals information from the peer eNB to avoid increase in HARQ latency due to CoMP reception. The predictor is less tolerant for uncertainty than in FIG. 5 case, the algorithm being less optimistic. Thus a retransmission may be requested is there uncertainty about the outcome of the CoMP reception. At 62 the reception succeeds after the second transmission and 'spatial increment' from the CoMP. Next TB can now be scheduled. This embodiment aims to maximise UE throughput at price of some unnecessary retransmissions. It also relies on the accuracy of HARQ predictor as higher layer automatic repeat request (ARQ) can result if TB decoding fails even if HARQ predictor estimated correct decoding to be very likely. The HARQ predictor can be adjusted, for example based on testing, simulations or data from real life operations, to produce acceptable rate of higher layer ARQs.

In accordance with a further possibility a combination of the above embodiments is employed. In the case of uncertain outcome the HARQ channel can be halted until the outcome of the CoMP reception, as in FIG. 5. However, if the predictions is that the CRC check is likely to succeed after CoMP reception, ACK can be sent early and next TVB scheduled, as shown in FIG. 6. In this scenario reliance is put upon positive HARQ prediction to determinate TB retransmissions early while unnecessary retransmissions can be avoided when the outcome of CoMP reception is uncertain.

A further embodiment aims for improving coverage for e.g. for Voice over Internet Protocol (VoIP) in case of strict backhaul capacity limited scenarios. In accordance with this embodiment VoIP UEs in cell edge situations are indicated beforehand for suitable secondary Rx points. This can be done to limit increase on computational load. For first transmission(s), use of CoMP reception is avoided. However, each secondary Rx point locally decodes the corresponding TB and updates the HARQ buffer for each transmission. If the allowed number of retransmissions is reached without successful decoding in primary Rx point, TB is selected for CoMP reception. The received signal information collected over all transmissions is signalled to the primary Rx point or CeS.

By this arrangement, the inter-site CoMP potential for coverage improvement may be achieved while the signalling load on backhaul can be reduced. This is possible since the backhaul is used only for TBs for which HARQ is about to fail.

In the following certain aspects in relation to the suspension of the retransmission channels is described. Currently, the PHICH carries one bit ACK/NACK information per transmission block (TB). Although sending an ACK on PHICH as described above allows currently for suspending the HARQ channel, a mechanism for reactivation of the HARQ channel after the CoMP reception can also be desired. Currently, a possibility to provide the reactivation is by means of a PDCCH UL grant. Although this will provide scheduling of next transport block, and works also for retransmissions, use of PDCCH uplink grant may not always be optimal. PDCCH UL grant is quite large and use of PDCCH for non-adaptive HARQ retransmission triggering can be wasteful as it increases PDCCH overhead and/or increases risk that there is not enough PDCCH resources for all UL grants and DL assignments that eNB would like to transmit.

In accordance with an embodiment, an explicit indication that the retransmission is suspended, for example a "WAIT" indication can be signalled on the PHICH. The indication suspends the HARQ channel until a final ACK or NACK after a CoMP reception is provided. Sending of a postponed NACK on a second HARQ message can then be used to trigger a non-adaptive retransmission of a transmission block. According to a possibility two bits can be transmitted in parallel on the PHICH. The original HARQ message may be extended to two bits e.g., by allocating two PHICH resources for the UE, for example analogously to the manner how an UL MIMO UE is provided with two HARQ ACK/NACK messages in spatial multiplexing of two TBs in accordance with LTE release 10. The extended PHICH indicator can be used to signal, instead of a simple ACK/NACK, that HARQ channel is temporally suspended because of CoMP reception. To illustrate this by an example, the extended PHICH indicator sent on two PHICH resources after 4 ms of PUSCH can contain two bits, with 3 states as follows:

1) NACK: Retransmit TB immediately (Rel-8 operation)
2) ACK: Suspend HARQ channel (Rel-8 operation)
3) "Wait": Suspend HARQ channel, and check the second HARQ ACK/NACK message after CoMP reception.

The usage of extended PHICH indicator can be triggered via higher layer configuration (e.g., using radio resource control; RRC). A new PHICH region can be introduced to carry the second HARQ message containing actual or final ACK/NACK information after the CoMP reception. There can be mapping between the original PHICH resources and the new PHICH resource carrying the actual ACK/NACK. Furthermore, existing signalling included e.g. in DCI Format 0 or DCI Format 4 can be used to avoid PHICH collision between different UEs on the new PHICH resources. The normal PHICH resource can be mapped to a resource in the new PHICH region occurring n*8 ms after the normal PHICH.

Suspension by means of the WAIT indication can be used to avoid the need to reactivate the HARQ channel by a scheduling message on PDCCH if the decoding procedure in CoMP reception finally fails. Should the decoding fail at the end, a postponed NACK can be sent on the second HARQ message which triggers a non-adaptive retransmission for the information block. The explicit suspension or 'WAIT' indication differs from the HARQ channel suspension by ACK on the first HARQ message in that that the UE receiving the indication will check the content of the second HARQ message on the new PHICH resources for final ACK/NACK. Inclusion of WAIT indication or similar on the extended PHICH indicator allows also for that that it is necessary to reserve a PHICH resource for the second HARQ message within the new PHICH resources only for those TBs actually selected for CoMP reception. In other words, no PHICH resource needs to be reserved for the second HARQ message when HARQ channel is suspended by sending ACK. A UL MIMO UE can be configured with spatial multiplexing of two TBs. The corresponding two HARQ ACK/NACK messages can be bundled in the single ACK/NACK message in an extended PHICH indicator. Basically a 3GPP Release 10 2-bit PHICH message can be compressed into an 1-bit PHICH message so that extended PHICH indicator can be used with two PHICH resources.

A control apparatus can be provided at the transmitting station that detects reception of an indication that retransmission of the information block is to be suspended, and then suspends the retransmission until e.g. reception of ACK or NACK or another a predefined event, such as end of a pre-define period.

The required data processing apparatus and functions of a control apparatus for the selection and/or multipoint reception, a communication device and any other node or element may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations for the selection and subsequent operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may be practiced in various components such as integrated circuit modules. The design of integrated circuits is by and large an automated process. Complex and powerful tools are available for converting a logic level design into a semiconductor circuit design ready to be formed on a semiconductor substrate.

The embodiments may allow for better optimisation of use of multipoint reception in view of limited backhaul capacity, in particular in case of moderate and long backhaul latency. Dynamic matching of backhaul signalling load to the backhaul capacity limitation can be provided. Gains by the multipoint reception are not necessarily substantially affected. Unlike the known solutions for extending HARQ feedback timing to allow for larger latency on backhaul by increasing the number of HARQ channels and/or changing of the UL HARQ to asynchronous HARQ a backward compatible solution may be provided by some of the embodiments. This is so because an uplink CoMP can be made transparent to user equipments as the combining occurs at the network side and thus legacy user equipments can be used in the UL CoMP operation.

It is noted that whilst embodiments have been described in relation to LTE-Advanced, similar principles can be applied to any other communication system where a carrier comprising a multiple of component carriers is employed. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. An apparatus for controlling retransmissions in multipoint reception, the apparatus comprising at least one processor, and at least one memory including computer program code, wherein the at least one memory and the computer program code are configured, with the at least one processor, to
    decode at least one received information block,
    determine that additional information is needed for decoding the at least one received information block,
    predict a likely outcome of decoding the at least one information block when additional information from multipoint reception is taken into account; and
    select a procedure for obtaining the additional information from a plurality of options to proceed based on information about the predicted likely outcome.

2. An apparatus according to claim 1, wherein the apparatus is configured, when selecting the procedure, to take into account at least one of decoding gain from the multipoint reception, data communications capacity between multiple reception points, and at least one earlier retransmission.

3. An apparatus according to claim 1, configured to selectively suspend retransmission of the at least one information block.

4. An apparatus according to claim 3, configured to suspend the retransmission by causing sending to a transmitting station an indication of the suspension, wherein the indication comprises one of a positive acknowledgement and an explicit suspension request.

5. An apparatus according to claim 1, configured to decode the at least one information block with assistance of the additional information which is received from at least one secondary reception point and to cause sending of a negative or positive acknowledgement depending on the outcome of the decoding based on the additional information.

6. An apparatus according to claim 1, configured to select at least one user equipment for which additional information for decoding is obtained from at least one secondary reception point.

7. An apparatus according to claim 1, configured to select the procedure on a per transport block basis.

8. An apparatus according to claim 1, wherein the multipoint reception is based on hierarchical coordinated multipoint, the apparatus being configured to receive the at least one information block from a remote reception point.

9. An apparatus according to claim 1, wherein the multipoint reception is based at least partially on peer-to-peer coordinated multipoint, the apparatus being configured to receive the information block from a transmitting device and to receive the additional information from another reception point.

10. An apparatus according to claim 1, configured to take into account cumulative backhaul load associated with at least one user equipment.

11. An apparatus according to claim 1, configured to calculate a selection metric reflecting an expected gain from the multipoint reception and use the selection metric in selection of information blocks for multipoint reception.

12. An apparatus according to claim 1, configured to selectively cause suspension of retransmission or scheduling of a next information block based on the prediction.

13. An apparatus according to claim 1, configured to predict the likely outcome by determining
- an estimate of expected increase in signal to interference and noise ratio (SINR) caused by multipoint reception,
- relative increase in probability of successful decoding,
- increase in throughput, and/or
- decrease of latency.

14. An apparatus according to claim 1, configured to reflect impact of the selection on available radio resources by means of weighting.

15. An apparatus according to claim 1, configured to recalculate a selection metric and/or re-sort received information blocks based on information of used backhaul capacity.

16. An apparatus according to claim 1, configured to take into account local detection metrics received from peer reception points when predicting the likely outcome.

17. An apparatus according to claim 1, configured to prioritize at least one link associated with reception of the additional information.

18. An apparatus according to claim 1, configured to preselect at least one secondary reception point and to obtain the additional information from the pre-selected secondary reception points in response to receiving a predefined number of retransmissions.

19. An apparatus for controlling retransmissions, the apparatus comprising at least one processor, and at least one memory including computer program code, wherein the at least one memory and the computer program code are configured, with the at least one processor, to:
- predict a likely outcome of decoding a received information block when additional information from multipoint reception is taken into account,
- based on the predicted likely outcome, determine whether retransmission of the received information block is to be suspended,
- selectively generate an indication of one of a positive acknowledgement of the received information block, a negative acknowledgement of the received information block and suspension of retransmission of the received information block, and
- cause sending of the indication on a retransmission control channel.

20. A method for controlling retransmissions in multipoint reception, comprising
- receiving at least one information block,
- determining that additional information is needed for decoding of the at least one received information block,
- predicting a likely outcome of decoding the at least one information block when additional information from multipoint reception is taken into account and
- selecting a procedure for obtaining the additional information from a plurality of options to proceed based on information about the predicted likely outcome.

21. A method according to claim 20, wherein the selecting comprises taking into account at least one of decoding gain from the multipoint reception, data communications capacity between multiple reception points, and at least one earlier retransmission.

* * * * *